United States Patent [19]
Jenrich et al.

[11] Patent Number: 5,205,850
[45] Date of Patent: Apr. 27, 1993

[54] PARTICULAR FILTER

[75] Inventors: Thielo Jenrich, Wiesbaden; Dietmar Thalheim, Offenbach; Horst Kalfa, Idstein, all of Fed. Rep. of Germany

[73] Assignee: Didier-Werke AG, Wiesbaden, Fed. Rep. of Germany

[21] Appl. No.: 888,906

[22] Filed: May 26, 1992

[30] Foreign Application Priority Data

Jun. 25, 1991 [DE] Fed. Rep. of Germany ....... 4120920

[51] Int. Cl.⁵ ............................................. B01D 29/17
[52] U.S. Cl. ...................................... 55/350; 55/484; 55/502; 55/523; 55/DIG. 10
[58] Field of Search ...................... 55/337, 341.1, 350, 55/484, 502, 523, DIG. 10, DIG. 30

[56] References Cited
FOREIGN PATENT DOCUMENTS 3235363 3/1984 Fed. Rep. of Germany .

Primary Examiner—Robert Spitzer
Attorney, Agent, or Firm—Wenderoth, Lind & Ponack

[57] ABSTRACT

A particulate filter includes a housing having opposite ends, a pair of support walls adjacent respective opposite ends of the housing and defining therein an interior, and a pair of pure gas chambers defined at respective opposite ends of the housing at sides of the respective support walls outwardly of the interior. A plurality of elongated filter bodies are supported by the support walls to extend therebetween within the housing with longitudinal axes of the filter bodies extending parallel. The filter bodies define outwardly thereof within the housing a raw gas chamber in the form of a plurality of elongated raw gas compartments. Hollow interiors of the filter bodies define respective elongated pure gas channels. Each pure gas channel opens into at least one of the pure gas chambers. A raw gas supply inlet connection opens into the interior of the housing at a position between the pair of support walls such that raw gas is supplied to the exterior of the filter bodies in a direction transverse to the direction of elongation of the raw gas compartments and transverse to the longitudinal axes of the filter bodies.

22 Claims, 4 Drawing Sheets

PARTICULAR FILTER

BACKGROUND OF THE INVENTION

The present invention relates to a particulate filter including a housing having therein a plurality of cylindrical, ceramic filter bodies that define within the housing a group of raw gas side channels and a group of pure gas side channels, with one group of channels formed by compartments within the housing and with the other group of channels formed by the interiors of the filter bodies.

A particulate filter of this type is disclosed in German DE 32 35 363 A1. In such known particulate filter, raw gas is delivered into the interiors of the filter bodies at one axial end of the filter. Thus, particulate matter such as soot that is filtered from the raw gas is deposited internally on the surfaces of the interiors of the filter bodies. Therefore, compressed clusters of soot are formed on the interior surfaces of the filter bodies, and such compressed clusters are difficult to clean or remove. Pure gas filters through the filter bodies and passes to the exterior compartments from which it is drawn off at an opposite axial end of the filter. In such an arrangement, the raw gas streams and the pure gas streams flow substantially parallel to one another and parallel to the longitudinal axes of the filter bodies. When viewed over the axial length of the filter bodies, this results in non-uniform gas flow conditions, and this can have a negative impact on the filtering function. Clusters that form in the interiors of the filter bodies not only are difficult to clean and remove, but also they increase zonally or locally resistance to gas flow.

SUMMARY OF THE INVENTION

With the above discussion in mind, it is an object of the present invention to provide a particulate filter of the above described general type, but having an improved construction and function.

This object is achieved in accordance with the present invention by the provision of a particulate filter of the above-described general construction, but including a pair of enclosures or support walls supporting the filter bodies. These support walls define therebetween an axial extent of the particulate filter and an axial extent of an interior of a filter housing. The support walls also define, on sides thereof outwardly of the housing interior, a pair of separate, pure gas chambers at opposite axial ends of the filter bodies. The filter bodies extend between the two support walls with longitudinal axes of the filter bodies extending substantially parallel. The filter bodies define outwardly thereof within the housing a raw gas chamber in the form of a plurality of elongated raw gas compartments. The hollow interiors of the filter bodies define respective elongated pure gas channels. Each of the pure gas channels, i.e. a respective filter body interior, opens into at least one of the pure gas chambers. The filter housing has, at a position between the two support walls, a raw gas supply connection that opens into the interior of the housing in a direction transverse to the direction of elongation of the raw gas compartments.

The raw gas thus is supplied to the exterior surfaces of the filter bodies, and not to the interiors thereof as in the above-discussed prior art arrangement. Since the outer surfaces of the filter bodies are larger than the inner surfaces thereof, the total filter surface area on which soot or particulate matter is deposited is increased.

Furthermore, the raw gas stream from the raw gas supply or inlet connection strikes the outer surfaces of the filter bodies transversely or at right angles to the direction of the longitudinal axes of the filter bodies. This results in a very uniform distribution of particulate matter or soot on the outer surfaces of the filter bodies. This improves the overall functioning of the particulate filter and also facilitates regeneration of the filter surfaces of the particulate filter. Such regeneration can be accomplished by burning off the deposited soot particles or by blowing back from the pure gas side of the particulate filter.

Since a pair of pure gas chambers are provided, i.e. one pure gas chamber at each of opposite axial ends of the filter bodies, in contrast to the prior art arrangement wherein only a single pure gas chamber is provided at only one axial end of the filter bodies, the particulate filter according to the present invention is improved with regard to conditions of construction and assembly. The filter bodies can open alternately in the direction of one or the other of the pure gas chambers, and specifically the filter bodies can extend and open through the two support walls alternately. As a result, it is necessary that each filter body be attached sealingly only to that support wall through which that filter body opens in the direction of the respective pure gas chamber. It is not necessary that filter body be sealed with respect to the support wall at the other axial end. As a result, the overall design of the particulate filter may be made much more compact, since the sealing structure requires more space than simply support structure. Additionally, the possibility of repair of the particulate filter according to the invention is improved, since alternate of the filter bodies can be replaced from opposite of the two pure gas chambers. During such operation, the particulate filter does not have to be disconnected from the raw gas supply.

Additionally however, it is possible within the contemplated scope of the invention to provide that the interior of each of the filter bodies is open into both of the pure gas chambers. By such a construction the flow conditions of the gas are improved, since the gas can flow from each filter body into both of the pure gas chambers.

BRIEF DESCRIPTION OF THE DRAWINGS

Other objects, features and advantages of the present invention will be apparent from the following detailed description, taken with the accompanying drawings, wherein.

DETAILED DESCRIPTION OF THE INVENTION

Figure 1:
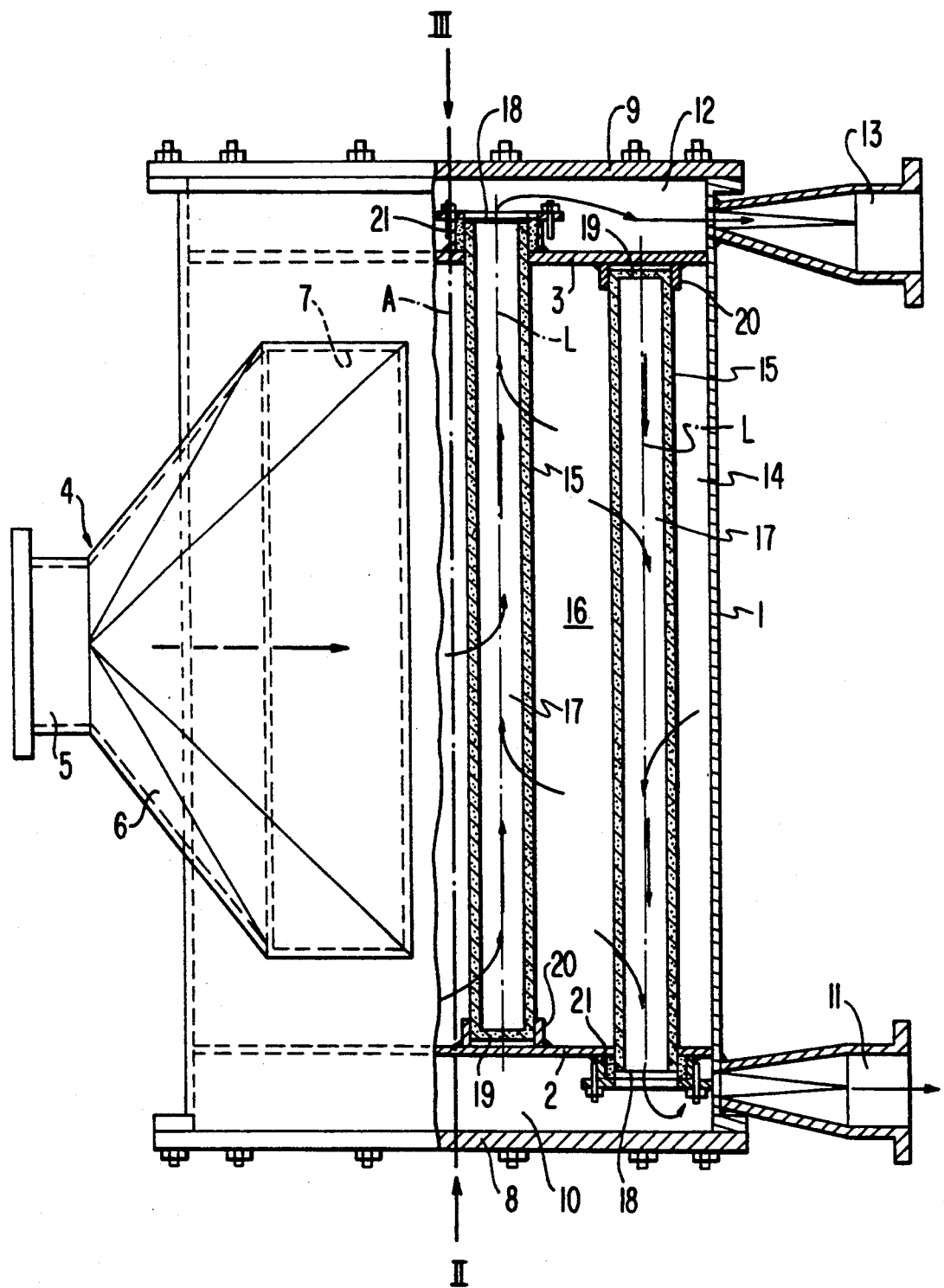
FIG. 1 is a schematic plan view, partially broken away, of a particulate filter according to the present invention, and wherein a housing thereof is shown partially open and only a portion of the filter bodies thereof are illustrated.

A particulate filter according to the present invention includes a cylindrical housing 1 having opposite ends. Within the interior of the housing 1 and adjacent the opposite ends thereof are welded a pair of end walls 2, 3 that form supports for filter bodies, to be described subsequently. A raw gas supply or inlet connection 4 is attached to housing 1 at an area between the two walls 2, 3. Such raw gas connection includes a pipe connector or union 5 connected to an enlarged funnel portion 6 which extends from pipe union 5 into a substantially rectangular inlet opening 7 in housing 1. Thus, raw gas to be filtered is supplied through raw gas connection 4 and through inlet opening 7 into the interior of the housing 1. The inlet opening 7 occupies a major portion of the length or dimension of housing 1 between the two walls 2, 3.

The opposite ends of housing 1 are closed, at positions outwardly of walls 2, 3, by respective removable cover members 8, 9. The space between wall 2 and cover 8 forms a pure gas chamber 10 from which pure gas can be withdrawn through a pure gas outlet connection 11. Similarly, the space between wall 3 and cover 9 forms another pure gas chamber 12 from which pure gas can be withdrawn through pure gas outlet connection 13. The space within housing 1, between walls 2, 3 and into which opens inlet opening 7 forms a raw gas chamber 14.

A plurality of cylindrical, ceramic filter bodies are disposed within the housing interior between the two support walls 2, 3. In the specific embodiment illustrated, the filter bodies are in the form of filter cartridges 15. Such filter cartridges extend through raw gas chamber 14, and outer surfaces of cartridge 15 define within chamber 14 a plurality of elongated raw gas compartments 16. The filter cartridges 15 have respective longitudinal axes L that extend parallel to each other and also parallel to a longitudinal axis A of housing 1.

Figure 4:
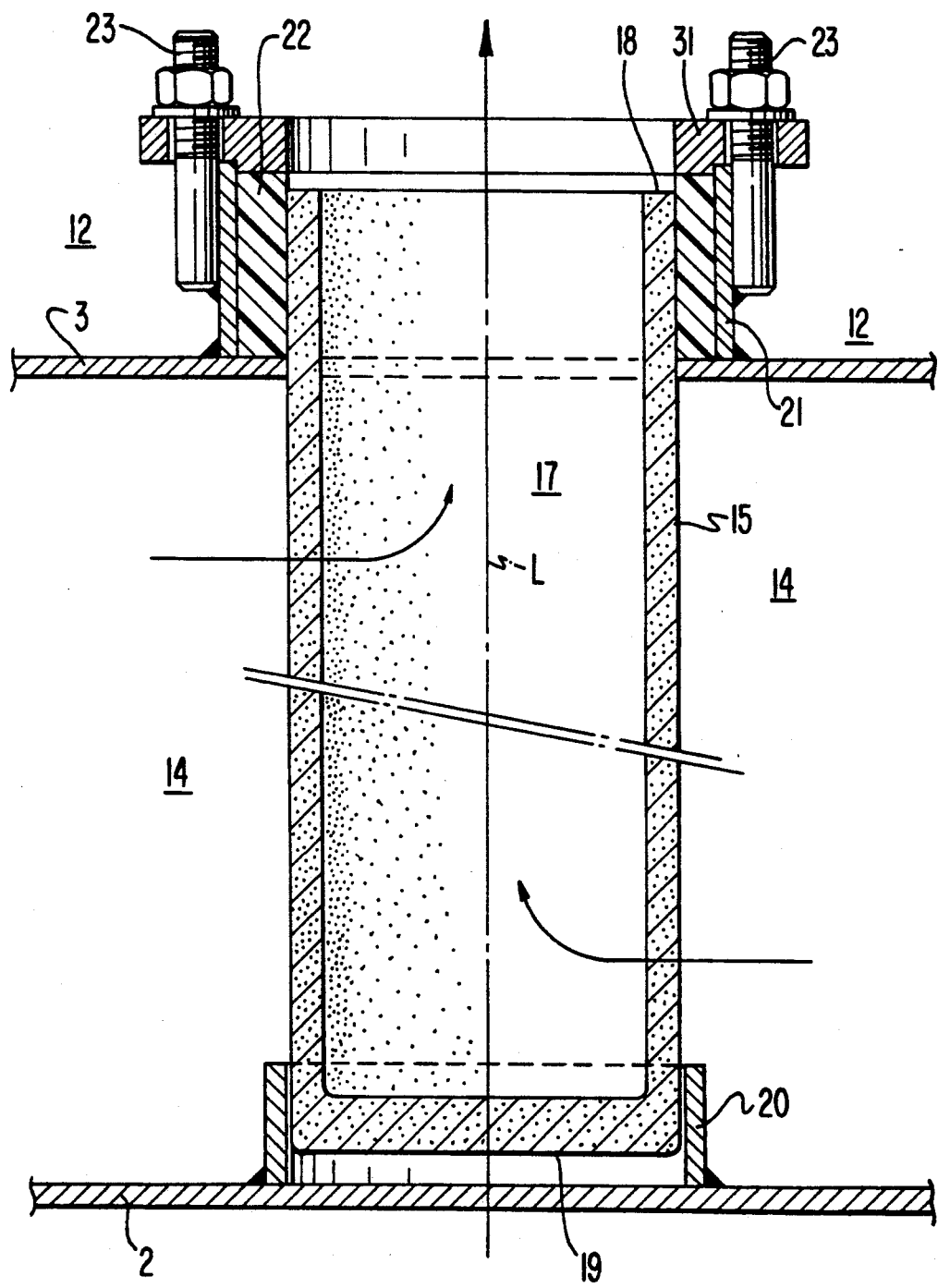
FIG. 4 is an enlarged partial view showing the manner of mounting and support of opposite axial ends of one filter body.

Each filter cartridge 15 has an interior 17 that defines a pure gas channel. In the illustrated embodiment, the interior 17 of each filter cartridge 15 is open at one axial end 18 and closed at another axial end 19. The open axial end 18 of each filter cartridge extends through a respective support wall 2 or 3 and opens into a corresponding pure gas chamber 10 or 12. The closed axial end 19 of each filter cartridge 15 is supported, for example by a respective insertion ring 20, at one of the support walls 2, 3. The open end 18 of each filter cartridge 15 extends through an opening in the respective wall 2, 3 and is sealed thereto by a sealing sleeve 21. The diameter of sealing sleeve 21 is greater than the diameter of insertion ring 20, since a seal 22 must be positioned between sealing sleeve 21 and the open end 18 of the respective filter cartridge. Seal 22 is, for example as shown in more detail in FIG. 4, a stuffing box packing that is forced between sealing sleeve 21 and the open end 18 of the respective filter cartridge 15. This is achieved by a ring 31 that is clamped onto bolts 23 that are fixed, for example by welding, to sealing sleeve 21.

In the arrangement illustrated, some of the filter cartridges 15 have the open ends thereof sealed to one of the walls 2 or 3, and the remainder of the filter cartridges 15 have the open ends thereof sealed to the other of the support walls 3 or 2. Thus, all of the filter bodies are not sealed to only one of the support walls. By this arrangement, it is possible to provide a very dense or compact arrangement of the filter cartridges within the housing 1. This is due to the fact that all of the sealing sleeves for all of the filter bodies do not have to be provided on one support wall. This is advantageous, since the sealing sleeves and other sealing structure occupy more space than the insertion rings 20. As a result, the space required by the total number of sealing structures is distributed over the two support walls 2, 3. Therefore, a portion of the interior 17 of the filter cartridges 15 open into pure gas chamber 10, and another portion of the interior 17 of the filter cartridges 15 open into the pure gas chamber 12.

Figure 2:
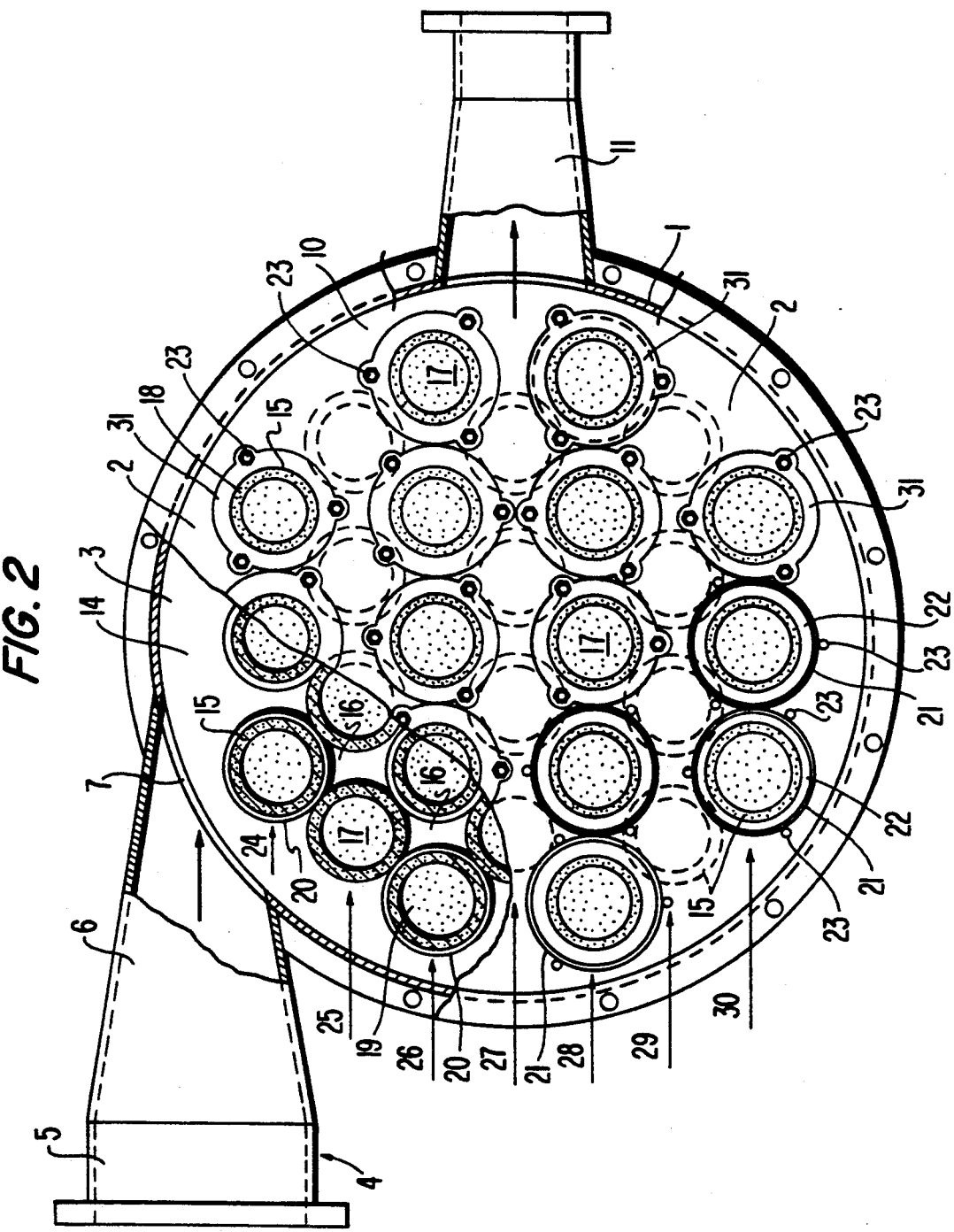
FIG. 2 is an end view from the direction of arrow II in FIG. 1.
Figure 3:
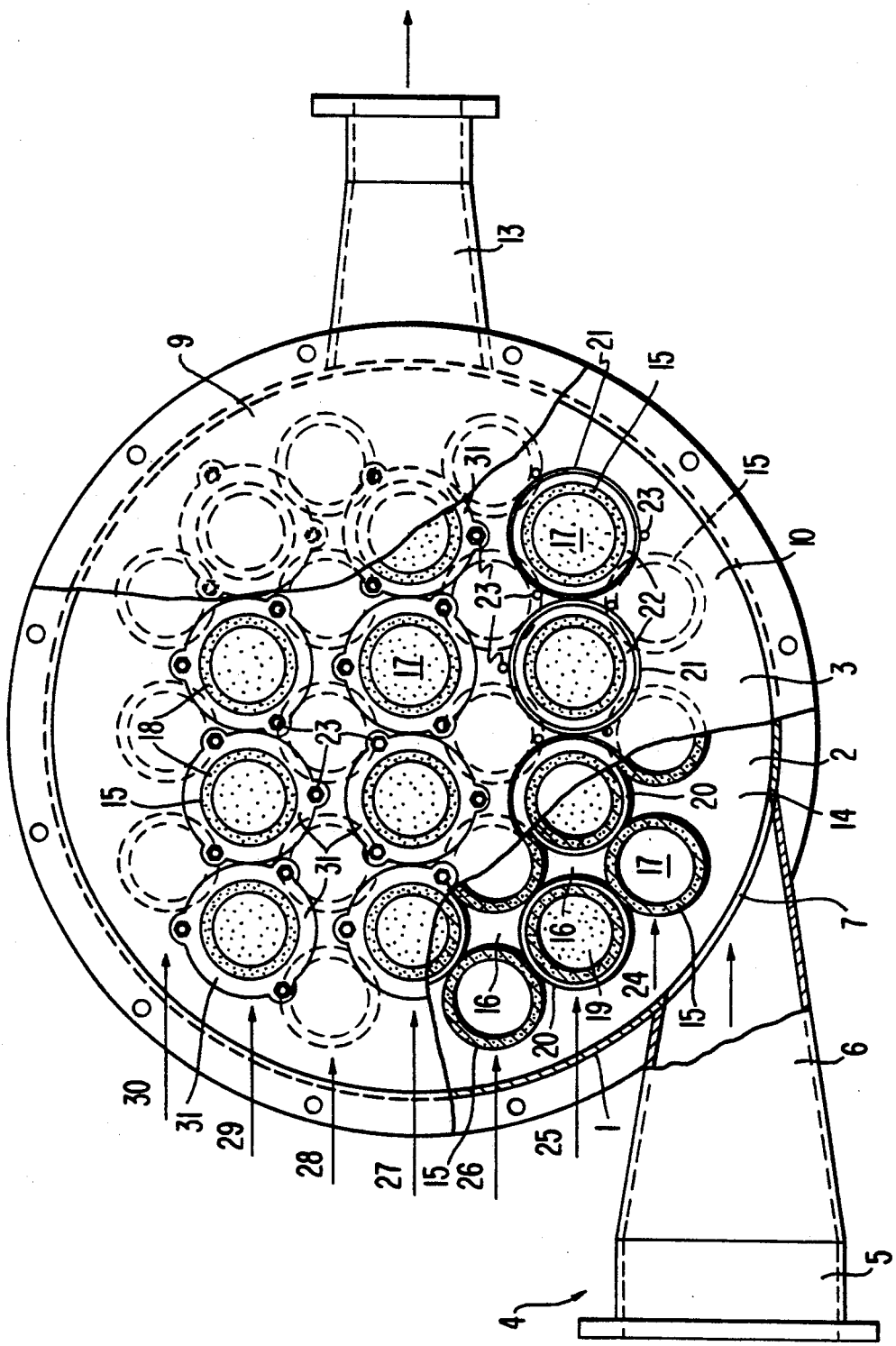
FIG. 3 is an end view from the opposite end as viewed in the direction of arrow III in FIG. 1.

In the particular arrangement of the above structure illustrated in FIGS. 2 and 3, the filter cartridges 15 are arranged in vertically spaced rows 24–30. The filter bodies of rows 24, 26, 28, 30 are sealed to support wall 2 and therefore the interiors of such filter bodies open into pure gas chamber 10. On the other hand, the filter bodies of rows 25, 27, 29 are sealed to support wall 3 and the interiors of such filter bodies open into pure gas chamber 12. By this arrangement, it is possible to provide a very compact design of the filter cartridges 15 within raw gas chamber 14. To provide for raw gas flow, in this compact arrangement, to the innermost arranged of the filter cartridges 15, a distance between adjacent filter cartridges 15 may be, for example, 2 mm where the outer diameter of the filter cartridges is approximately 50 mm. However, the filter cartridges can be arranged even closer, and even in touch with each other within the raw gas chamber 14. In such an arrangement, the porosity of the material of the filter cartridges will ensure adequate flow of the raw gas to the innermost arranged filter cartridges within the housing 1.

The compact design of the particulate filter according to the present invention makes it possible to achieve a high utilization of the volume within housing 1. Thus, a substantial amount of such volume is occupied by filter surfaces of the filter bodies that receive and filter particulate matter from the raw gas. However, this advantage is attainable even if the filter cartridges 15 are arranged differently than in the described and illustrated rows 24–30. What is important for such high volume utilization in this embodiment of the present invention is that one group or portion of the filter cartridges 15 are attached in a sealed manner to only one support wall 2 and another portion or group of the filter cartridges is attached in a sealed manner only to the other support wall 3.

The illustrated and above-described specific embodiment of the particulate filter according to the present invention functions in the following manner. Raw gas to be filtered is delivered through raw gas inlet connection 4 and opening 7 into the interior of the housing, i.e. into raw gas chamber 14. The raw gas is supplied substantially uniformly into the elongated compartments 16 in directions at right angles to the longitudinal axes L of the filter cartridges. As a result, viewed over the total length of the cartridges 15, the outer surfaces thereof are loaded substantially uniformly with the raw gas. The direction of loading or the direction at which the raw gas stream strikes the outer surfaces of the filter cartridges is radial or tangential to the longitudinal axes L. This results in a uniform deposit of particulate matter such as soot particles on the outer surfaces of the filter cartridges 15. The filtered, pure gas that passes through the material of the cartridges enters the interiors 17 thereof, i.e. the pure gas channels, and then flows to and is collected in one or the other of the pure gas chambers 10, 12. The interiors 17 do not form any particular resistance to such flow.

Due to the fact that the outer surfaces of the filter cartridges are loaded uniformly, soot particles that collect thereon readily can be removed, for example by burning, to achieve regeneration of the filter. Such uniform loading and collection of soot particles also enables regeneration of the filter by means of blowing back from pure gas chambers 10, 12.

Maintenance of the particulate filter described above is simple and does not require long periods of time for disassembly and assembly. Rather, it simply is necessary to remove covers 8, 9 to obtain access to filter cartridges 15. Housing 1 does not have to be removed from either raw gas supply connection 4 or from pure gas outlet connections 11, 13.

In accordance with another contemplated embodiment of the present invention it also is possible to provide, instead of filter cartridges, tubular filters or filter nozzles that are open at both opposite axial ends. One such open end then would be supported sealingly in respective insertion ring 20.

In yet another contemplated embodiment of the present invention however, it also is possible to provide that some or all of the filter bodies open into both of the pure gas chambers 10, 12. The spatial design of such a particulate filter then will be less compact, since it would be necessary to provide that each of the opposite axial ends of the filter body passes through and is sealed to a respective support wall. Nevertheless, such an embodiment still would have other advantages of the present invention.

Although preferred embodiments of the present invention have been described and/or illustrated in detail, it is to be understood that other and various modifications and changes may be made to the specifically described and/or illustrated features without departing from the scope of the present invention.

What is claimed is:

1. A particulate filter comprising:
   a housing having opposite ends;
   a pair of support walls adjacent respective said opposite ends of said housing and defining therein an interior;
   a pair of pure gas chambers defined at respective said opposite ends of said housing at sides of respective said support walls outwardly of said interior;
   a plurality of elongated filter bodies having respective longitudinal axes and hollow interiors, said filter bodies being supported by said support walls to extend therebetween within said housing with said longitudinal axes extending generally parallel, such that said filter bodies define outwardly thereof within said housing a raw gas chamber in the from of a plurality of elongated raw gas compartments, and such that said hollow interiors of said filter bodies define respective elongated pure gas channels;
   each said pure gas chamber having opening thereinto at least one of said pure gas channels, and each said pure gas channel opening into at least one of said pure gas chambers;
   said housing having, at a position between said pair of support walls, a raw gas supply connection opening into said interior of said housing in a direction transverse to the direction of elongation of said raw gas compartment; and
   means for discharging pure gas from said pair of pure gas chambers.

2. A filter as claimed in claim 1, wherein each said filter body comprises a filter cartridge having an open first axial end and a closed second axial end.

3. A filter as claimed in claim 2, wherein said open first axial end opens into one of said pure gas chambers, and said closed second axial end is blocked from opening into the other of said pure gas chambers.

4. A filter as claimed in claim 3, wherein said open first axial end extends through and is sealed to one of said support walls, and said closed second axial end is supported by the other of said support walls and blocked thereby from communication with said other pure gas chamber.

5. A filter as claimed in claim 3, wherein a first group of said filter bodies open at respective open axial ends thereof into a first said pure gas chamber, and a second group of said filter bodies open at respective open axial ends thereof into a second said pure gas chamber.

6. A filter as claimed in claim 3, wherein adjacent said filter bodies open alternately into respective said pure gas chambers.

7. A filter as claimed in claim 1, wherein each said filter body opens at a first axial end thereof into one of said pure gas chambers and is blocked at a second axial end thereof from opening into the other of said pure gas chambers.

8. A filter as claimed in claim 7, wherein said first axial end extends through and is sealed to one of said support walls, and said second axial end is supported by the other of said support walls and blocked thereby from communication with said other pure gas chamber.

9. A filter as claimed in claim 7, wherein a first group of said filter bodies open at respective first axial ends thereof into a first said pure gas chamber, and a second group of said filter bodies open at respective first axial ends thereof into a second said pure gas chamber.

10. A filter as claimed in claim 7, wherein adjacent said filter bodies open alternately into respective said pure gas chambers.

11. A filter as claimed in claim 1, wherein said filter bodies are cylindrical.

12. A filter as claimed in claim 1, wherein said filter bodies are ceramic.

13. A filter as claimed in claim 1, wherein said pair of support walls are sealed within said housing.

14. A filter as claimed in claim 1, wherein said housing is cylindrical between said opposite ends thereof.

15. A filter as claimed in claim 1, wherein said filter bodies open at respective opposite axial ends thereof into both of said pure gas chambers.

16. A filter as claimed in claim 1, wherein said discharging means comprises pure gas outlet connections extending from respective of said pure gas chambers.

17. A filter as claimed in claim 1, further comprising cover members removably connected to respective said opposite ends of said housing and defining with respective said support walls respective said pure gas chambers.

18. A filter as claimed in claim 1, wherein said raw gas supply gas connection includes an expanded funnel portion defining an opening in said housing.

19. A filter as claimed in claim 18, wherein said opening is rectangular.

20. A filter as claimed in claim 18, wherein said opening is elongated in a direction parallel to said longitudinal axes of said filter bodies.

21. A filter as claimed in claim 18, wherein said opening extends through a major portion of a dimension of said housing between said support walls.

22. A filter as claimed in claim 1, wherein said raw gas supply connection extends in a direction to deliver raw gas to said compartments with components of flow direction extending perpendicular to said longitudinal axes of said filter bodies.

* * * * *